May 4, 1965 W. F. MELLEN 3,181,890
TRAILING IMPLEMENT WITH SWING JOINT
Filed May 4, 1962 3 Sheets-Sheet 1

INVENTOR.
WILLIAM FISK MELLEN
BY HIS ATTORNEYS
HARRIS, KIECH, RUSSELL & KERN

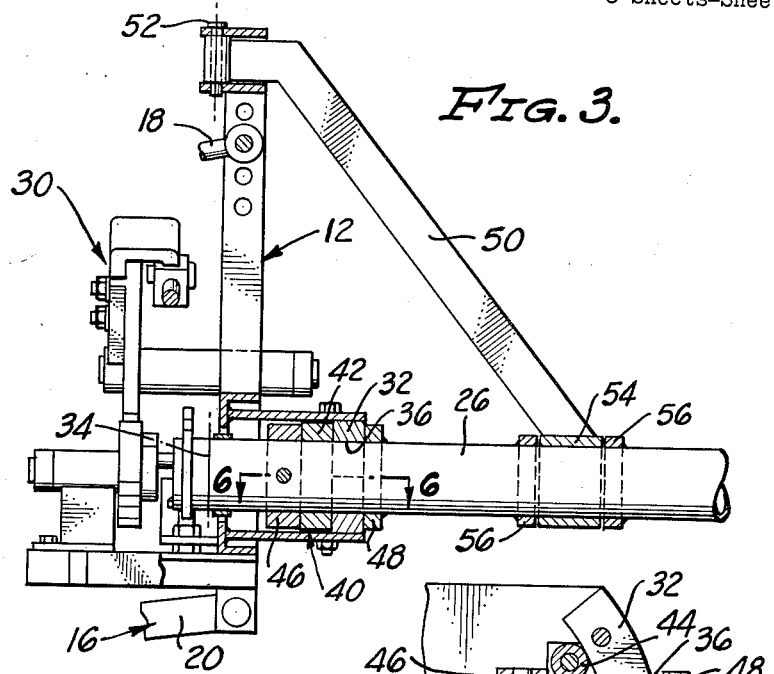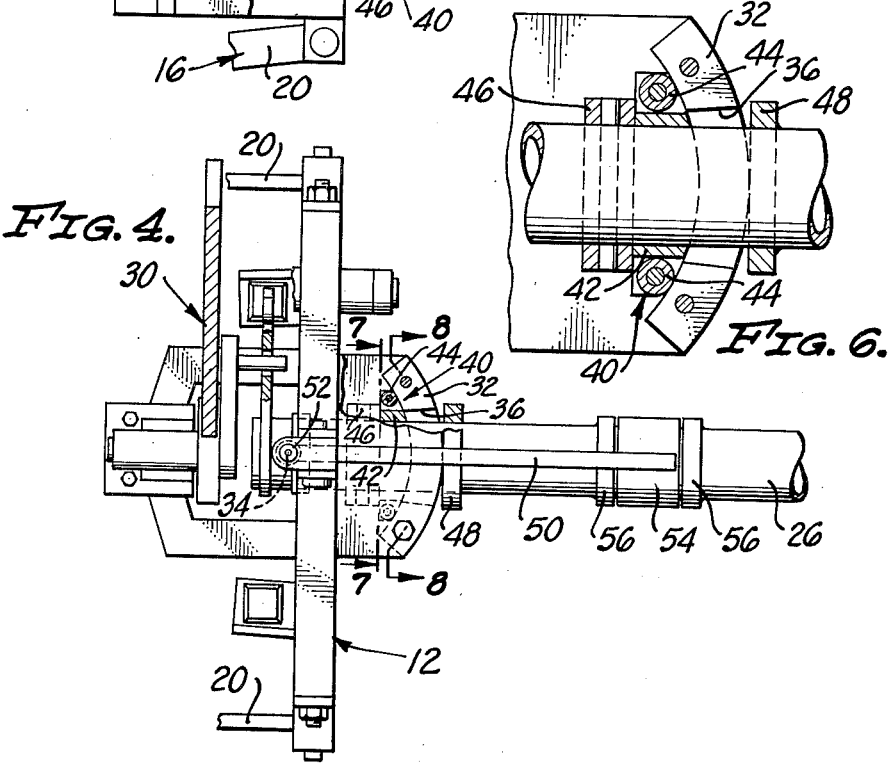

May 4, 1965
W. F. MELLEN
3,181,890
TRAILING IMPLEMENT WITH SWING JOINT
Filed May 4, 1962
3 Sheets-Sheet 3
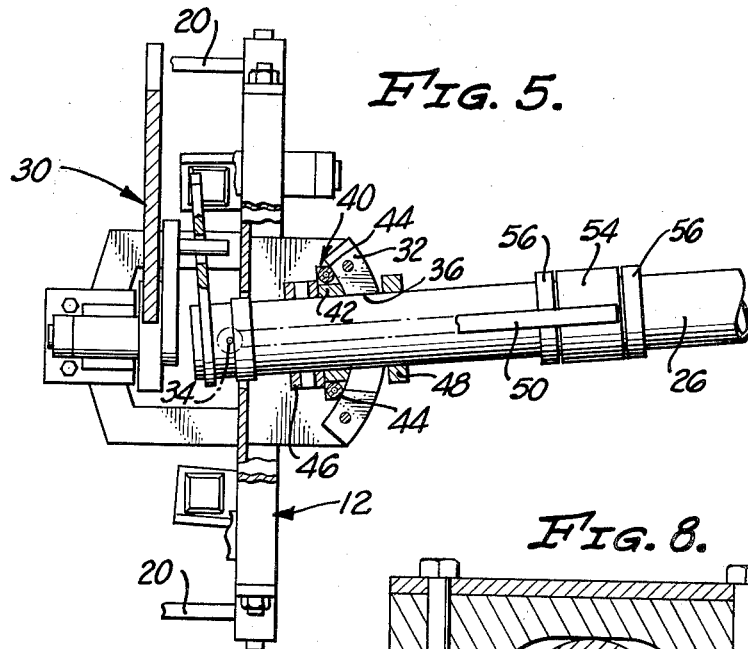
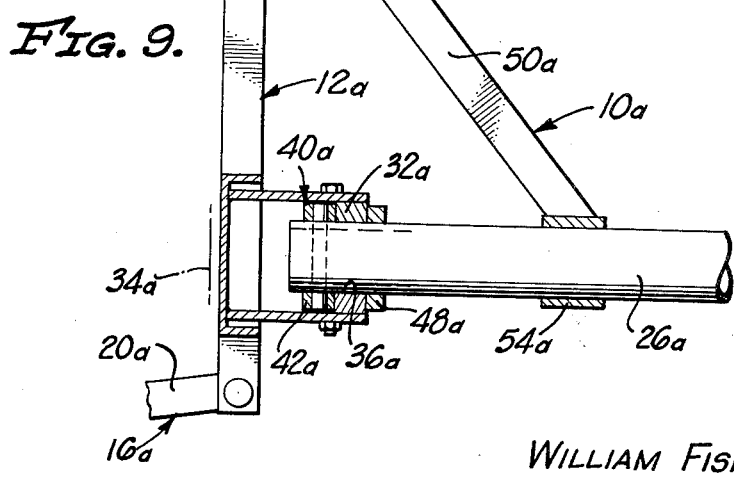
INVENTOR.
WILLIAM FISK MELLEN
BY HIS ATTORNEYS
HARRIS, KIECH, RUSSELL & KERN

United States Patent Office 3,181,890
Patented May 4, 1965

3,181,890
TRAILING IMPLEMENT WITH SWING JOINT
William Fisk Mellen, Anaheim, Calif.
(P.O. Box 2032, Fullerton, Calif.)
Filed May 4, 1962, Ser. No. 192,425
5 Claims. (Cl. 280—447)

The present invention relates in general to trailing implements to be drawn by tractors, or the like, and is particularly applicable to such trailing agricultural implements as one-way and two-way plows. Consequently, it will be considered in such connection herein as a matter of convenience.

Conventional plows of the foregoing nature characteristically include a frame, typically an A-frame, having a plow beam extending rearwardly therefrom, the A-frame being connected to a tractor by the usual three-point hitch which serves as a draft means for the plow and which also serves to raise the plow out of the ground and to lower it into the ground. The plow beam carries at least one moldboard-type plow bottom, and may carry two or more such plow bottoms arranged in either one-way or two-way relation.

As disclosed in my Patent No. 2,900,032, granted August 18, 1959, it is advantageous in plows of the foregoing nature to permit the plow beam to swing laterally relative to the A-frame in operation, by so connecting the plow beam to the A-frame as to permit it to swing back and forth laterally about an upright pivot axis located adjacent the forward end of the plow beam. As discussed in detail in my aforementioned patent, this provides a plow which automatically compensates for side draft by constantly swinging laterally into a position wherein there is no net side draft.

With the foregoing as background, a primary object of the present invention is to provide a pivotal connection between the plow beam and the A-frame, permitting lateral swinging movement of the plow beam relative to the A-frame about an upright pivot axis adjacent the forward end of the plow beam, which is an improvement on that disclosed in my aforementioned patent.

More particularly, a primary object of the invention is to provide a pivotal interconnection between the plow beam and the A-frame comprising: an upright, forwardly concave, cylindrical bearing segment carried by the A-frame and having an opening through which the plow beam extends and which is laterally wider than the plow beam so that the plow beam can swing laterally therein; and bearing means on the plow beam forwardly of the bearing segment and seated against the bearing segment at laterally spaced points on opposite sides of the opening therein, the bearing means being movable laterally relative to the bearing segment to render the plow beam laterally swingable relative to the A-frame about an upright pivot axis coinciding with the axis of the bearing segment and through an angle dependent on the difference between the lateral widths of the plow beam and the opening in the bearing segment.

Another object is to provide a bearing means on the plow beam which comprises two laterally spaced, upright rollers seated against the bearing segment on opposite sides of the opening therein.

A further object is to provide a brace connected to the plow beam rearwardly of the bearing segment and pivotally connected to the A-frame above the plow beam, such brace transmitting part of the weight of the plow beam, and the plow bottom or bottoms carried thereby, to the upper end of the A-frame.

Still another object is to provide a two-way plow wherein the plow beam is pivotable about its axis, relative to the bearing means and brace mentioned, to permit the plow beam to assume either a left-hand or a right-hand plowing position.

The foregoing objects, advantages, features and results of the present invention, together with various other objects, advantages, features and results thereof which will be evident to those skilled in the art to which the invention relates in the light of this disclosure, may be achieved with the exemplary embodiments of the invention described in detail hereinafter and illustrated in the accompanying drawings, in which:

FIG. 3 is a sectional view taken as indicated by the arrowed line 3—3 of FIG. 2;

FIG. 4 is a top plan view, partially in horizontal section, of the structure shown in FIG. 3 of the drawings;

FIG. 5 is a view similar to FIG. 4, but showing various parts in different operating positions;

FIG. 6 is an enlarged, fragmentary sectional view taken as indicated by the arrowed lines 6—6 of FIG. 3;

Figure 7:
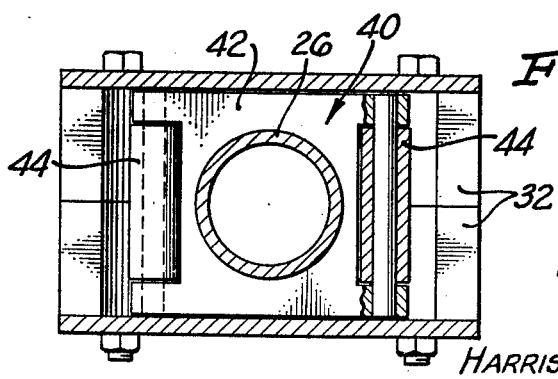

FIGS. 7 and 8 are enlarged, fragmentary sectional views respectively taken as indicated by the arrowed lines 7—7 and 8—8 of FIG. 4; and FIG. 9 is a view similar to FIG. 3, but illustrating the invention incorporated in a one-way plow.

Figure 1:
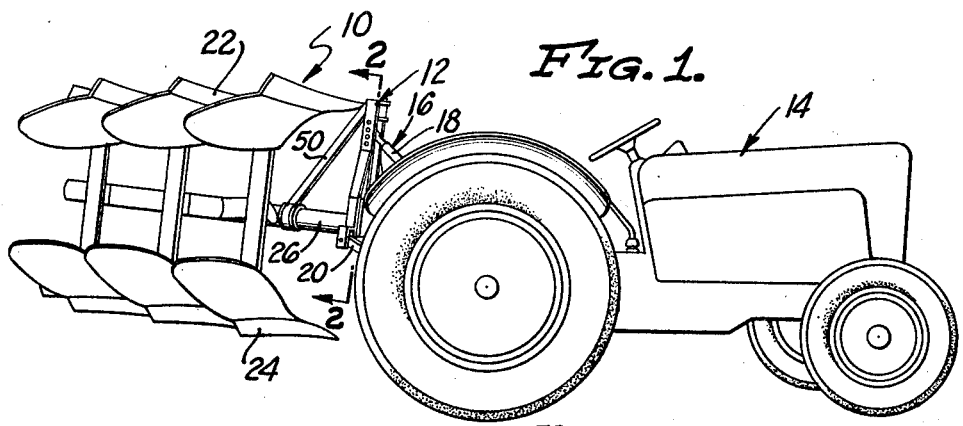
FIG. 1 is a perspective view of a tractor-mounted two-way plow which embodies the invention.
Figure 2:
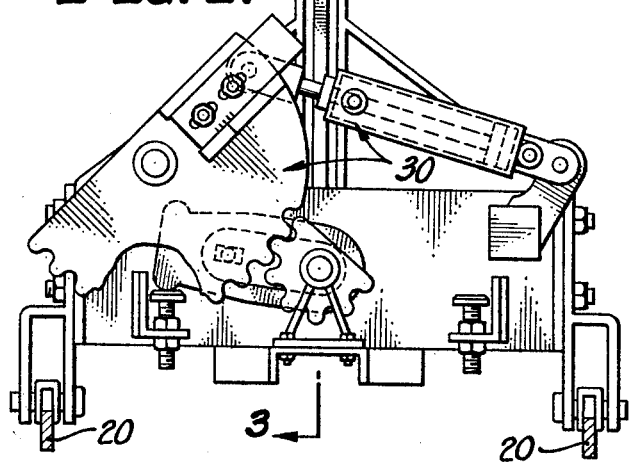
FIG. 2 is an enlarged, fragmentary sectional view taken as indicated by the arrowed line 2—2 of FIG. 1.

Illustrated in FIG. 1 of the drawings is a plow 10 of the invention provided at its forward end with a frame, typically an A-frame 12, connected to a wheel-type tractor 14 by a conventional three-point hitch 16 for raising and lowering the plow 10. The hitch 16 includes an upper link 18 pivotally connected to the upper end of the A-frame 12, and two lower links 20 connected to the lower end of the A-frame on opposite sides thereof. This general structure is conventional and no further description is necessary.

In the particular construction illustrated in FIGS. 1 to 8 of the drawings, the plow 10 is a two-way plow and includes left-hand and right-hand moldboard-type plow bottoms 22 and 24, respectively, carried by a plow beam or shaft 26 which extends rearwardly from the A-frame 12 and which is rotatable relative thereto about its own axis to bring one or the other of the two sets of plow bottoms into play. However, the invention is also applicable to a one-way plow, as illustrated in FIG. 9 of the drawings and as described in detail hereinafter in connection with that figure.

In FIGS. 2 to 5 of the drawings is shown an actuating means 30 for rotating the plow beam 26 about its axis between the respective operating positions for the left hand and right hand plow bottoms 22 and 24. The actuating means 30 is disclosed in detail in my Patent No. 3,107,735, granted October 22, 1963. Consequently, a further description herein is not necessary. Also, it will be understood that other actuating means for rotating the plow beam 26 between its operating positions may be used within the scope of the present invention.

Referring to FIGS. 3 to 8 of the drawings, mounted on the A-frame 12 on the rearward side thereof is an upright, forwardly concave, cylindrical bearing segment 32 having an upright axis located slightly forwardly of the A-frame and designated by the numeral 34. As best shown in FIGS. 5 and 8, the plow beam 26 extends rearwardly through a central fore-and-aft opening 36 in the bearing segment 32. The opening 36 is laterally wider than the plow beam 26 so that the plow beam can swing laterally back and forth therein about the upright axis 34 of the bearing segment 32, as will become apparent. The angular range of lateral swinging movement of the plow beam 26 is dependent on the difference between the lateral widths of the plow beam and the opening 36. It will be understood that such lateral swinging movement of the plow beam 26 is for the purpose of rendering the plow 10 self aligning, as discussed in detail in my aforementioned Patent No. 2,900,032.

The plow beam 26 carries bearing means 40 located forwardly of the bearing segment 32 and seated against the bearing segment at laterally spaced points respectively located on opposite sides of the opening 36. To minimize friction, the bearing means 40 preferably comprises a bearing member 42 through which the plow beam 26 extends and which carries rollers 44 rotatable about upright axes and respectively engageable with the bearing segment 32 on opposite sides of the opening 36 therein. With this construction, the plow beam 26 is swingable back and forth laterally about an upright pivot axis coinciding with the axis 34 of the bearing segment 32.

In the two-way plow 10 under consideration, the plow beam 26 is a shaft, preferably a tubular shaft, of circular cross section which is rotatable about its own axis in the bearing member 42, whereby the plow beam 26 may be rotated between the operating positions of the two sets of plow bottoms 22 and 24. With this construction, the drag on the plow beam 26 is transmitted to the bearing member 42 by a thrust collar 46 mounted on the plow beam and suitably secured thereto. Preferably, another thrust collar 48 is mounted on the plow beam 26 rearwardly of the bearing segment 32 to limit forward movement of the plow beam.

The foregoing construction provides a simple and sturdy pivotal interconnection between the plow beam 26 and the A-frame 12, and one which has large bearing areas to minimize wear.

Part of the weight of the plow beam 26, and the plow bottoms 22 and 24 carried thereby, is transmitted to the A-frame 12 by a brace 50 which extends downwardly and rearwardly from the upper end of the A-frame to the plow beam at a point rearwardly of the A-frame. The brace 50 is connected to the A-frame 12 at its upper, forward end by a pivot 52 the axis of which coincides with th pivot axis 34 of the plow beam 26. The brace 50 is connected at its lower, rearward end to a bearing 54 within which the plow beam 26 is rotatable about its own axis. Fixed on the plow beam 26 forwardly and rearwardly of the bearing 54 are collars 56 which limit forward and rearward movement of the plow beam 26 relative to the bearing 54.

Referring to FIG. 9 of the drawings, fragmentarily illustrated therein is a one-way plow 10a which is similar to the plow 10. Consequently, the parts of the plow 10a will be identified by adding the suffix "a" to the reference numerals utilized to identify the corresponding parts of the plow 10.

The main difference between the plows 10 and 10a is that, in the latter, the plow beam 26a does not rotate about its own axis relative to the A-frame 12a. Consequently, there is no necessity for any actuating means corresponding to the actuating means 30. Also, there is no necessity for any thrust collar corresponding to the thrust collar 46, and the bearing member 42a may be secured directly to the plow beam 26a. Further, the bearing 54a may be secured directly to the plow beam 26a.

With this construction, the plow beam 26a is swingable laterally about the pivot axis 34a in the same manner as the plow beam 26.

Although exemplary embodiments of the invention have been disclosed herein for purposes of illustration, it will be understood that various changes, modifications and substitutions may be incorporated in such embodiments without departing from the spirit of the invention as defined by the claims which follow:

I claim:

1. In a trailing implement to be drawn by a tractor, or the like, the combination of:
   (a) a frame connectible to the tractor;
   (b) a beam extending rearwardly from said frame;
   (c) an upright, forwardly concave, cylindrical bearing segment carried by said frame;
   (d) said bearing segment having an opening through which said beam extends and which is laterally wider than said beam so that said beam can move laterally therein;
   (e) bearing means on said beam forwardly of said bearing segment and seated against said bearing segment at laterally spaced points on opposite sides of said opening therein; and
   (f) said bearing means being movable laterally relative to said bearing segment to render said beam laterally swingable relative to said frame about an upright pivot axis coinciding with the axis of said bearing segment and through an angle dependent on the difference between the lateral widths of said beam and said opening.

2. In a trailing implement to be drawn by a tractor, or the like, the combination of:
   (a) a frame connectible to the tractor;
   (b) a beam extending rearwardly from said frame;
   (c) an upright, forwardly concave, cylindrical bearing segment carried by said frame;
   (d) said bearing segment having an opening through which said beam extends and which is laterally wider than said beam so that said beam can move laterally therein;
   (e) bearing means on said beam forwardly of said bearing segment and seated against said bearing segment at laterally spaced points on opposite sides of said opening therein;
   (f) said bearing means being movable laterally relative to said bearing segment to render said beam laterally swingable relative to said frame about an upright pivot axis coinciding with the axis of said bearing segment and through an angle dependent on the difference between the lateral widths of said beam and said opening; and
   (g) said bearing means comprising two laterally spaced, upright rollers seated against said bearing segment on opposite sides of said opening.

3. In a trailing implement to be drawn by a tractor, or the like, the combination of:
   (a) a frame connectible to the tractor;
   (b) a beam extending rearwardly from said frame;
   (c) an upright, forwardly concave, cylindrical bearing segment carried by said frame;
   (d) said bearing segment having an opening through which said beam extends and which is laterally wider than said beam so that said beam can move laterally therein;
   (e) bearing means on said beam forwardly of said bearing segment and seated against said bearing segment at laterally spaced points on opposite sides of said opening therein;
   (f) said bearing means being movable laterally relative to said bearing segment to render said beam laterally swingable relative to said frame about an upright pivot axis coinciding with the axis of said bearing segment and through an angle dependent on the difference between the lateral widths of said beam and said opening; and
   (g) a brace connected to said beam rearwardly of said bearing segment and pivotally connected to said frame above said beam.

4. In a trailing implement to be drawn by a tractor, or the like, the combiantion of:
   (a) a frame connectible to the tractor;
   (b) a beam extending rearwardly from said frame;
   (c) an upright, forwardly concave, cylindrical bearing segment carried by said frame;
   (d) said bearing segment having an opening through which said beam extends and which is laterally wider than said beam so that said beam can move laterally therein;
   (e) bearing means on said beam forwardly of said bearing segment and seated against said bearing segment at laterally spaced points on opposite sides of said opening therein;

(f) said bearing means being movable laterally relative to said bearing segment to render said beam laterally swingable relative to said frame about an upright pivot axis coinciding with the axis of said bearing segment and through an angle dependent on the difference between the lateral widths of said beam and said opening;

(g) said bearing means comprising two laterally spaced, upright rollers seated against said bearing segment on opposite sides of said opening; and (h) a brace connected to said beam rearwardly of said bearing segment and pivotally connected to said frame above said beam.

5. In a trailing implement to be drawn by a tractor, or the like, the combination of:

(a) a frame connectible to the tractor;

(b) a beam extending rearwardly from said frame;

(c) an upright, forwardly concave, cylindrical bearing segment carried by said frame;

(d) said bearing segment having an opening through which said beam extends and which is laterally wider than said beam so that said beam can move laterally therein;

(e) bearing means on said beam forwardly of said bearing segment and seated against said bearing segment at laterally spaced points on opposite sides of said opening therein;

(f) said bearing means being movable laterally relative to said bearing segment to render said beam laterally swingable relative to said frame about an upright pivot axis coinciding with the axis of said bearing segment and through an angle dependent on the difference between the lateral widths of said beam and said opening;

(g) a brace connected to said beam rearwardly of said bearing segment and pivotally connected to said frame above said beam; and (h) said beam being pivotable about its axis relative to said bearing means and said brace.

References Cited by the Examiner

UNITED STATES PATENTS

| 714,570 | 11/02 | Fowler | 172—206 X |
| 1,601,797 | 10/26 | Hansmann | 172—679 X |
| 2,753,191 | 7/56 | Smith | 280—405 |
| 2,844,083 | 7/58 | Du Shane | 172—239 |

FOREIGN PATENTS 553,989   1/57   Italy.

ANTONIO F. GUIDA, *Acting Primary Examiner.*

ABRAHAM G. STONE, *Examiner.*